United States Patent [19]
Crowe

[11] Patent Number: 5,980,002
[45] Date of Patent: Nov. 9, 1999

[54] STORAGE SYSTEM

[76] Inventor: Barry Arnold Crowe, Box 531, Lumsden, Saskatchewan, Canada, S0G 3C0

[21] Appl. No.: 08/673,426
[22] Filed: Jun. 28, 1996
[51] Int. Cl.⁶ ..................................................... A47B 81/06
[52] U.S. Cl. ......................................... 312/9.48; 312/9.28
[58] Field of Search ................................. 312/9.28, 9.48; 206/387.13, 387.1; 211/49.1, 40

[56] References Cited

U.S. PATENT DOCUMENTS

| | | |
|---|---|---|
| 363,852 | 5/1887 | Sage . |
| 384,770 | 6/1888 | Lewitt . |
| 1,058,098 | 4/1913 | Phillips ................................. 312/9.28 |
| 2,342,452 | 2/1944 | Casteen . |
| 2,738,049 | 3/1956 | Shepherd . |
| 3,744,866 | 7/1973 | Cook . |
| 3,909,088 | 9/1975 | Dennehey et al. . |
| 3,933,372 | 1/1976 | Mihos . |
| 4,365,712 | 12/1982 | Oishi et al. . |
| 4,655,345 | 4/1987 | Drake et al. ............................ 312/9.28 |
| 4,678,245 | 7/1987 | Fouassier . |
| 4,720,153 | 1/1988 | Hatcher . |
| 4,948,022 | 8/1990 | Van Dyke . |
| 4,950,039 | 8/1990 | Helling et al. ......................... 312/9.48 |
| 4,971,199 | 11/1990 | Price, Jr. et al. . |
| 5,038,235 | 8/1991 | Ohzawa et al. . |
| 5,097,946 | 3/1992 | Emrich . |
| 5,104,207 | 4/1992 | Lockhardt . |
| 5,171,075 | 12/1992 | Nagano et al. . |
| 5,177,722 | 1/1993 | Nakamichi et al. . |
| 5,191,977 | 3/1993 | Markovitz . |
| 5,193,891 | 3/1993 | Headley . |
| 5,297,675 | 3/1994 | Martucci . |
| 5,346,295 | 9/1994 | Richter . |

FOREIGN PATENT DOCUMENTS

| | | |
|---|---|---|
| 0904804 | 7/1972 | Canada . |
| 0134281 | 3/1985 | European Pat. Off. . |
| 0105901 | 10/1924 | Germany . |
| 0628170 | 3/1936 | Germany . |
| 2542786 | 3/1977 | Germany . |
| 0955557 | 4/1964 | United Kingdom . |
| 2250124 | 5/1992 | United Kingdom . |
| 8806794 | 9/1988 | WIPO . |

Primary Examiner—James R. Brittain
Assistant Examiner—Gerald A. Anderson
Attorney, Agent, or Firm—Adrian D. Battison; Murray E. Thrift

[57] ABSTRACT

The storage system is for use with storage cases particularly of the type used to enclose compact disks, video tapes, cassette tapes and the like, however it may also be used to store any other type of storage case that is compatible with this type of storage. The storage system enables the user to store and maintain a large collection of cases, to add a new addition to the collection at any location within the collection without shuffling the collection, and to remove unneeded portions of the collection without leaving gaps in the storage system.

17 Claims, 7 Drawing Sheets

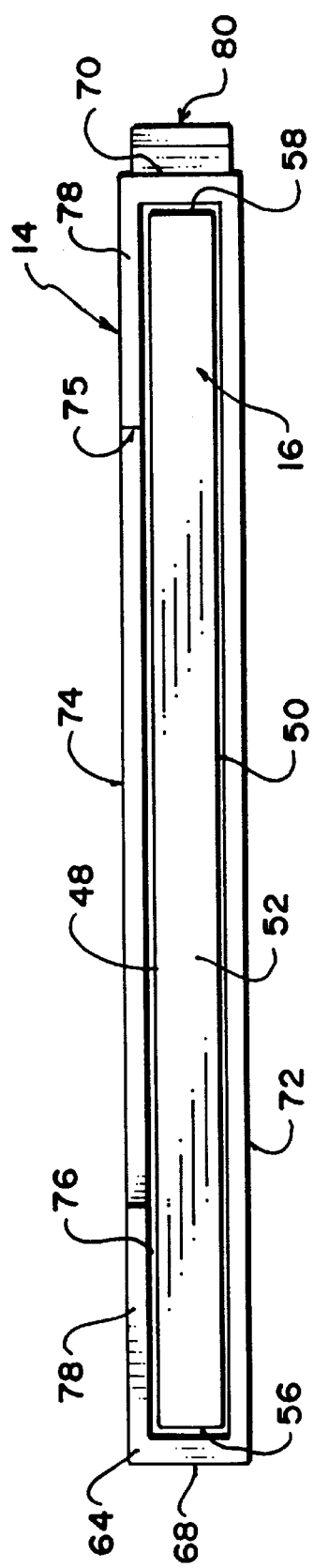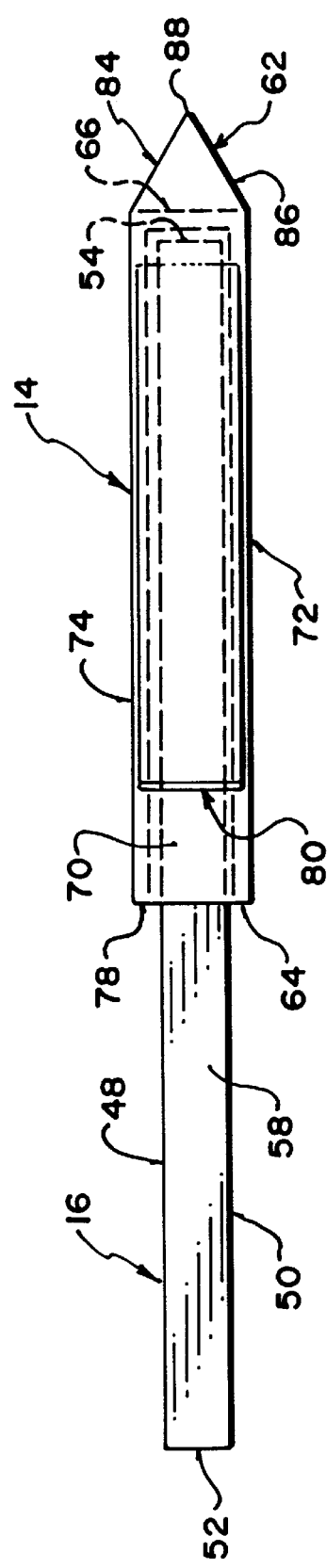

STORAGE SYSTEM

FIELD OF THE INVENTION

The present invention provides a storage system for use with storage cases particularly of the type used to enclose compact disks, video tapes, cassette tapes and the like, however it may also be used to store any other type of storage case that is compatible with this type of storage.

BACKGROUND OF THE INVENTION

Many large purchasers and users of compact disks, video, and cassette tapes such as radio and television stations, as well as private collectors store their collections of media in an organized manner such as in alphabetical order, by artist, by genre, by singer, by subject matter, by class, etc..

As collections grow it becomes increasingly difficult to maintain these collections as most existing storage means have fixed locations for storage of the media and are fixed in size. This leads to difficulty in maintaining the organizational scheme while adding new media to the collection. Maintaining the organizational scheme under these conditions often requires the time consuming process of shuffling all or a part of the whole collection to accommodate the new additions.

Conversely if selections from the collection are permanently removed gaps are left since the locations for storing the media are fixed. This leads to inefficient use of the storage space.

A storage system for use with storage cases particularly of the type used to enclose compact disks, video tapes, cassette tapes and the like, is needed which allows the user to store and maintain a large collection of media. The storage system needs to enable the user to add new additions at any location within the collection without shuffling the collection, and to enable the user to remove unneeded portions of the collection without leaving gaps.

SUMMARY OF THE INVENTION

It is, one object of the present invention, therefore, to provide a storage system for use with storage cases particularly of the type used to enclose compact disks, video tapes, cassette tapes and the like, which allows the user to store and maintain a large collection of media, enables the user to add new additions at any location within the collection without shuffling, and enables the user to remove unneeded portions of the collection without leaving gaps in the storage system.

According to the present invention there is provided a storage system for use with storage cases comprising:

a cabinet comprising at least one partition having two side walls, each side wall having an inner face arranged such that the respective inner faces lie opposite one another and spaced apart from one another;

a plurality of storage cases;

a plurality of cartridges, each one of said plurality of cartridges being sized and arranged for receiving at least one of said plurality of storage cases, and having engagement means for engaging the inner faces of the side walls of said at least one partition thereby holding the cartridge in place;

and wherein each one of said plurality of storage cases is manually removable from and reengageable with a respective one of said plurality of cartridges;

and wherein said plurality of cartridges are arranged in a row within said cabinet thereby presenting said plurality of storage cases.

and wherein each one of said plurality of cartridges is moveable along said row, and removable and reinsertable at any location within said cabinet.

Preferably each cartridge includes a front face, a rear face, a first pair of parallel walls perpendicular to the front and rear faces and arranged to lie adjacent and parallel to the opposing inner faces of the at least one partition, and a second pair of parallel walls perpendicular to the front and rear faces, and to the first pair of parallel walls.

Preferably the engagement means comprise a friction member extending outwards from an outer surface of each cartridge for frictionally engaging the inner faces of the side walls of the at least one partitions.

Preferably the front face of each cartridge is open for receiving a storage case therethrough.

Preferably one of the second pair of parallel walls includes a finger notch extending along an edge adjacent the open front face and projecting from the edge into the wall.

Preferably each cartridge includes an insertion means arranged opposite the open face for engaging cartridge positioned within the cabinet when being inserted thereby causing the cartridge positioned within the cabinet to move in opposite directions away from one another along the row.

Preferably the cabinet includes: an open front face of the cabinet; a pair of end walls being arranged perpendicular to the side walls of the at least one partition such that each end wall is located at a respective opposing end of the side walls; and an apron being removably and reengagably fixed adjacent one of the pair of end walls such that when engaged said apron covers a portion of the open front face of the cabinet.

One embodiment of the invention will now be described in conjunction with the accompanying drawings in which:

DESCRIPTION OF THE DRAWINGS

FIG. 4 is a front view of the cartridge with the storage case inserted.

FIG. 5 is a side view of the cartridge with the storage case inserted.

In the drawings like characters of reference indicate corresponding parts in the different figures.

DETAILED DESCRIPTION

Figure 1:
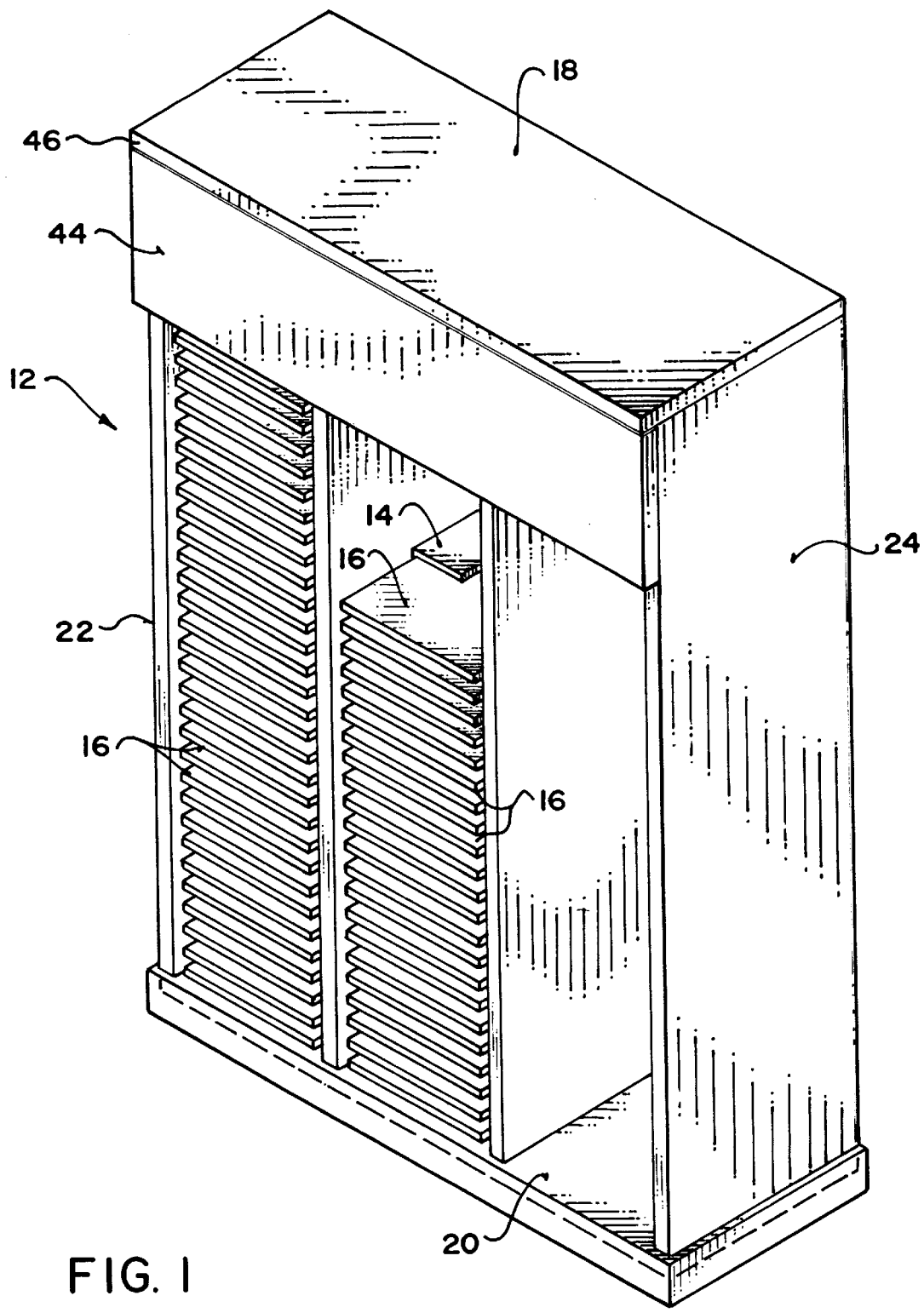
FIG. 1 is an isometric view of the storage system with the apron closed.
Figure 9:
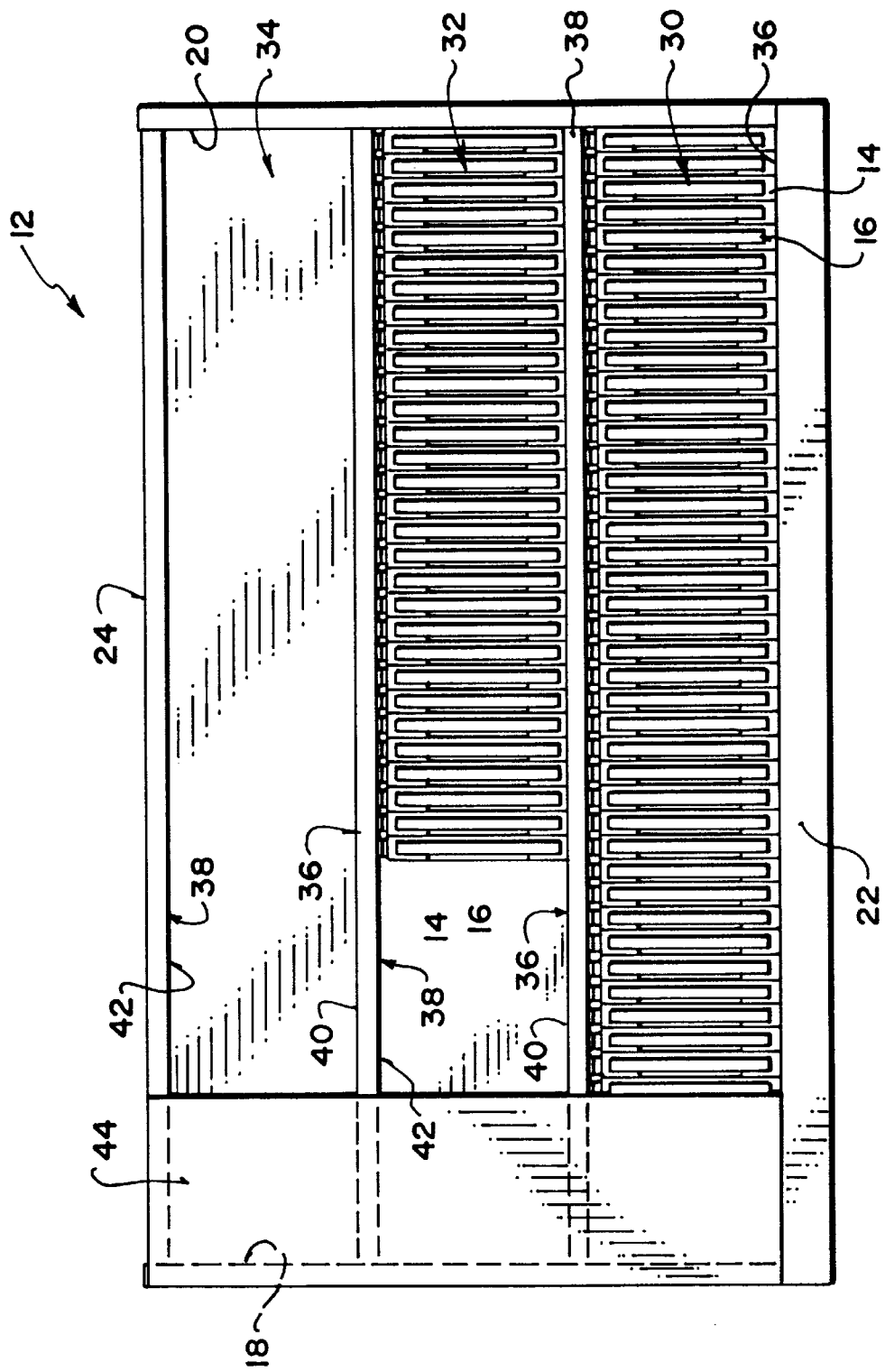
FIG. 9 is a front view of a horizontal embodiment of the storage system.

Referring to FIG. 1 shows a preferred embodiment of the storage system. The storage system is for use with storage cases particularly of the type used to enclose compact disks, video tapes, cassette tapes and the like, however it may also be used to store any other type of storage case that is compatible with this type of storage. Although the storage system is shown with the storage cases aligned in a vertical orientation, it may, in other embodiments be oriented horizontally as shown in FIG. 9, or in any other practical orientation.

The storage system comprises a cabinet 12, a plurality of cartridges 14, and a plurality of storage cases 16. Each storage case 16 is received within a cartridge 14 and is easily removed from and replaced within the cartridge 14. The plurality of cartridges 14 are arranged in a vertical row within the cabinet 12 thereby presenting the storage cases 16 to the user. The cartridges 14 are moveable along the row, and may be removed from the cabinet 12 or inserted into the cabinet 12 between any two other cartridges 14 at any location within the cabinet 12.

Figure 2:
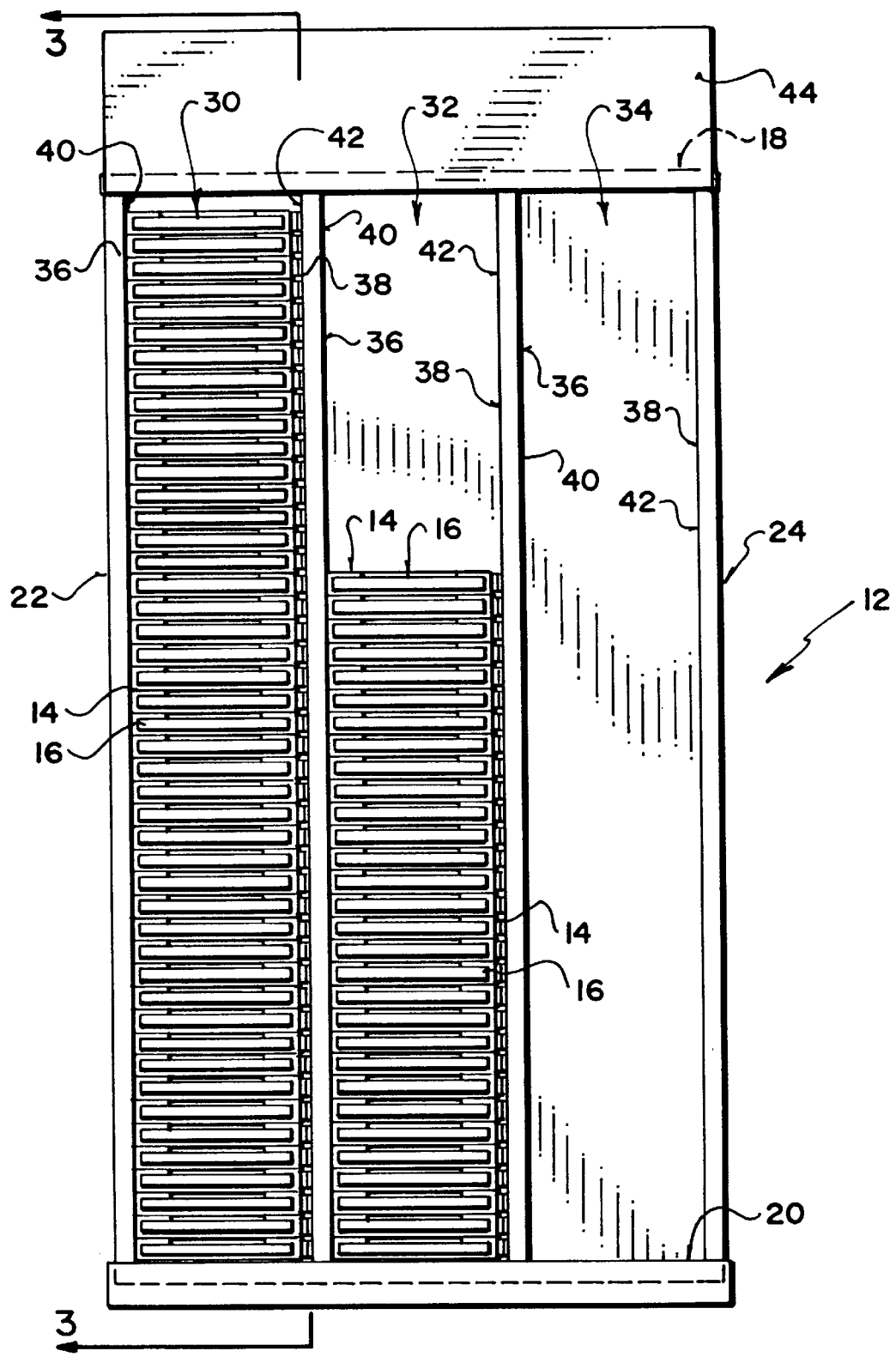
FIG. 2 is a front view of the storage system with the apron open.
Figure 3:
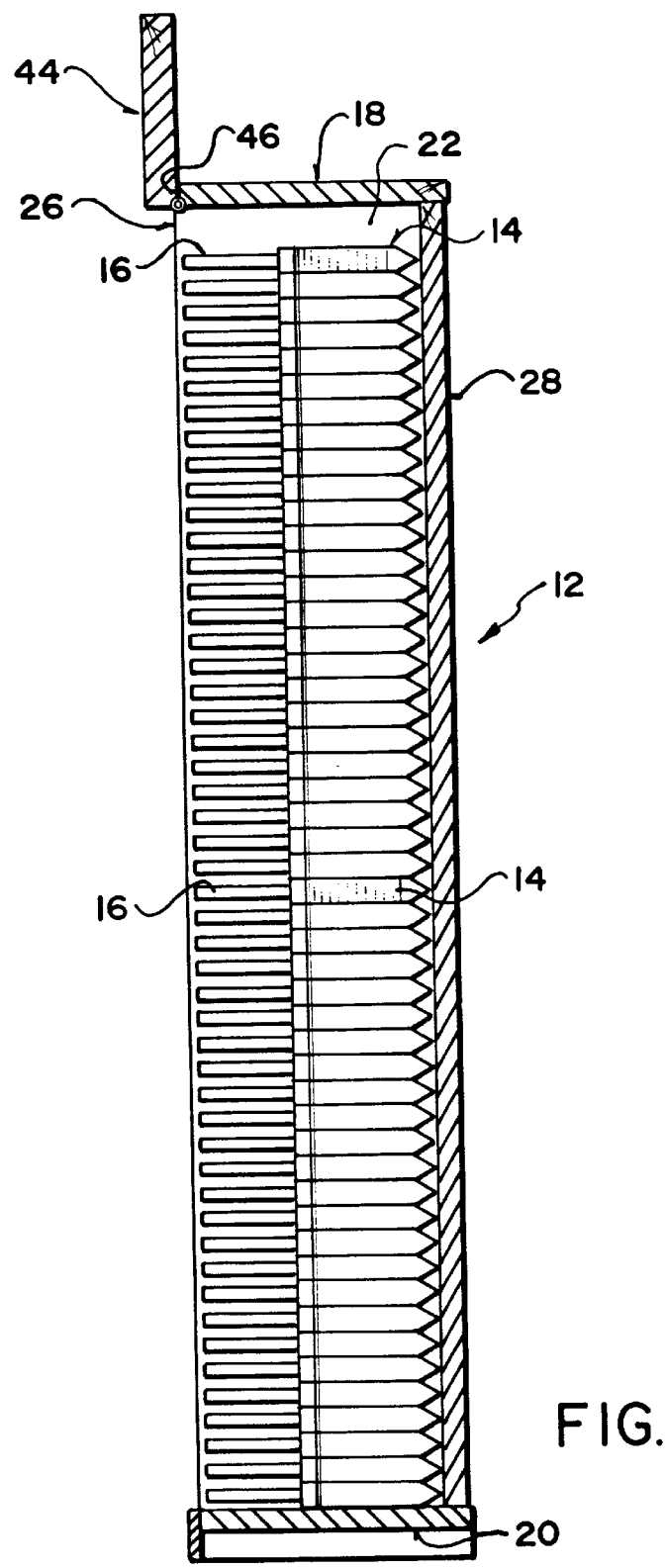
FIG. 3 is a cross sectional side view through lines 3—3 with the apron open.
Figure 6:
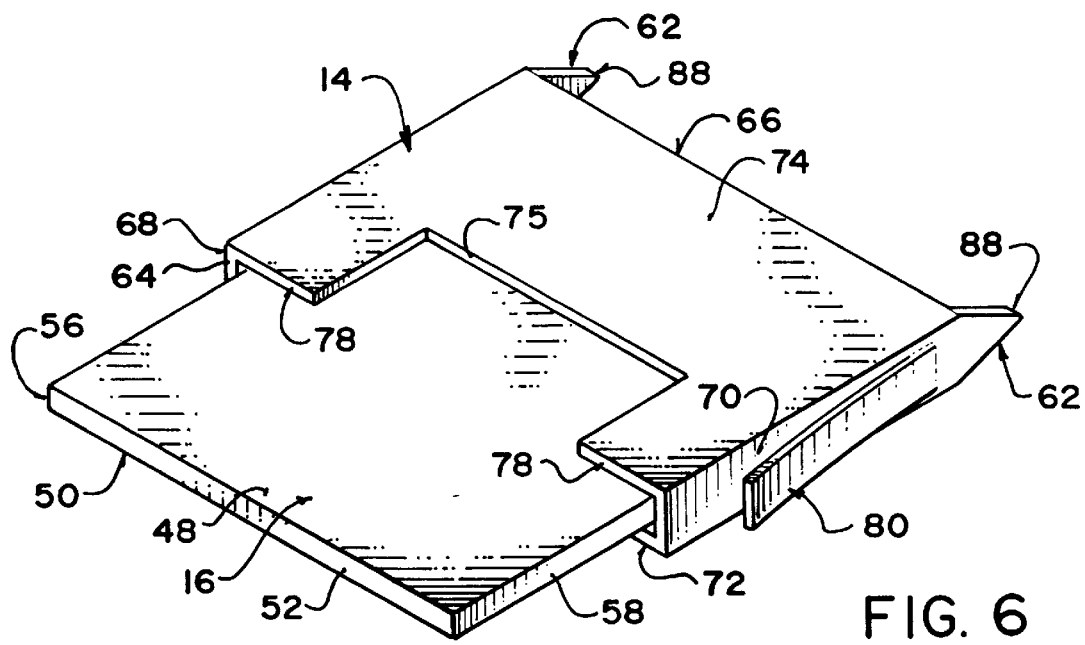
FIG. 6 is an isometric view of the cartridge with the storage case inserted.
Figure 7:
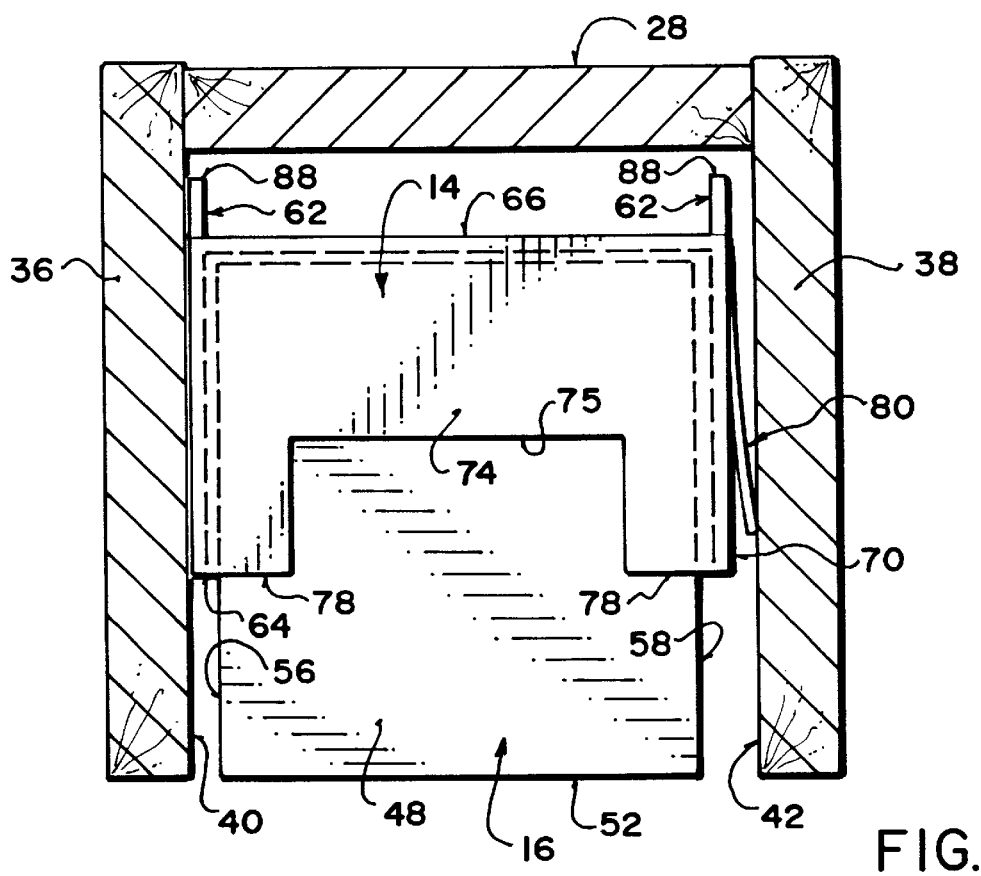
FIG. 7 is an top view of the cartridge with the storage case inserted.

Referring to FIGS. 1, 2 and 3 the cabinet 12 has a top wall 18, a bottom wall 20, two side walls 22 and 24, an open front face 26 and a rear face 28. The rear face 28 is shown closed by a wall in but can be either open or closed. The cabinet 12 includes at least one partition. In this embodiment three partitions 30, 32, and 34 are shown, however any practical number of partitions may be used. Each partition has two side walls 36 and 38 extending from the cabinet top wall 18 to the cabinet bottom wall 20. The partition side walls 36 and 38 may be one of the side walls of the cabinet or one of the walls separating adjacent partitions. Each partition side wall 36 and 38 has an inner face 40 and 42 arranged such that the respective inner faces 40 and 42 lie opposite one another and are spaced apart from one another. The cabinet top 18 and bottom walls 20 form a pair of end walls for each partition 30, 32, 34 lying perpendicular to the side walls 36 and 38 such that each end wall 18 and 20 is located at a respective opposing end of the side walls 36 and 38 of the partition.

An apron 44 is located on the front face 26 of the cabinet 12 connected along the front edge 46 of the top wall 18 of the cabinet 12 in such a way as to be moveable between a first position which covers a portion of the open front face 26 of the cabinet 12, and a second position which uncovers the portion.

Referring to FIG. 9 a horizontal embodiment of the cabinet 12 is shown. In this embodiment the apron 44 would lie adjacent a respective one of the pair of end walls 18 and 20 such that when moved the apron 44 similarly covers and uncovers the portion of the open front face 26 of the cabinet 12.

Referring to FIGS. 4 to 7 the plurality of storage cases 16 can be of any appropriate shape or type. Generally each storage case 16 will have a top wall 48, a bottom wall 50, a front wall 52, a rear wall 54, and two side walls 56 and 58. Each one of the cases 16 is manually removable and reinsertable through an opening 76 in the front face of a respective one of the cartridges 14. The storage case 16 can easily be removed from the cartridge 14 or inserted into the cartridge 14 when the cartridge 14 is either in the cabinet 12 or outside the cabinet 12.

Referring to FIGS. 4 to 7 one cartridge 14 of the plurality of cartridges 14 is shown. The cartridge 14 is sized and arranged for receiving at least one storage case 16. The cartridge 14 includes engagement means 80 for engaging the inner faces 40, 42 of the side walls 36, 38 of one of the partitions 30, 32, 34 thereby holding the cartridge 14 in place. As well the cartridge 14 has insertion means 62 for inserting the cartridge 14 between any two other cartridges 14 at any location within the cabinet 12.

The cartridge 14 includes a front face 64, a rear face 66, a first pair of parallel walls 68 and 70, and a second pair of parallel walls 72 and 74. The front face 64 of each cartridge 14 has an opening 76 for receiving a predetermined one or more storage cases 16 therethrough.

The first pair of parallel walls 68 and 70 lie perpendicular to the front 64 and rear faces 66 forming side walls of the cartridge 14. When inserted within the cabinet 12 the first pair of parallel walls 68 and 70 are arranged to lie adjacent and parallel to the opposing inner faces 40 and 42 of the sidewalls 36 and 38 of one of the partitions 30, 32, 34.

The second pair of parallel walls 72 and 74 lie perpendicular to the front 64 and rear faces 66, and perpendicular to the first pair of parallel walls 68 and 70 thereby forming top and bottom walls of the cartridge 14. One of the second pair of parallel walls 74 includes a finger notch 75 extending along an edge 78 adjacent the opening 76 in the front face 64. The finger notch 25 projects from the edge 78 adjacent the open front face 64 of the cartridge 14 a distance into the wall 74.

Each cartridge 14 includes engagement means for engaging inside surfaces of the partitions. In the example shown the engagement means comprises a friction member in the form of a tab 80 extending outwards from an outer surface of one of the first pair of parallel walls 68 and 70. The tab 80 frictionally engages the inner face 40, 42 of one of the side walls 36, 38 of one of the partitions 30, 32, 34. The tab 80 is composed of a resilient elongate member and extends longitudinally along the outer surface of one of the first pair of parallel walls 68 and 70. The tab 80 is fixed to the cartridge 14 near the rear of the cartridge 66 and extends at an angle outwards in a direction away from the cartridge 14 and towards the front of the cartridge 64 to a free end 82. The tab 80 is sized such that the width of the cartridge 14 added to the distance between the cartridge 14 and the free end 82 of the tab 80 is slightly greater than the distance between the opposing walls 40, 42 of the partition 30, 32, 34. In an alternative embodiment two tabs may be employed, one tab being located on a respective one of the first pair of parallel walls. In a yet further alternative (not shown), the engagement means is defined by the side surfaces of the cartridge itself. In this arrangement, the cartridge is formed with a slightly converging shape from the front toward the rear and is slightly compressible inwardly at the front against a resilient effect so that the side surfaces at the front can be squeezed together to engage between the partitions and are held in place by the frictional effect of the side surfaces against the partitions caused by the resilience.

Each cartridge 14 includes insertion means 62 arranged opposite the open face 64 of the cartridge 14 for engaging between any other two cartridges 14 positioned within the cabinet 12. The insertion means 62 when inserted between the two cartridges 14 in the cabinet 12 cause one or both of the two cartridges 14 in the cabinet 12 to move away from the other along the row of stored cartridges 14. The insertion means 62 is formed by a portion of each of the first pair of parallel walls 68 and 70 projecting out past the rear face 66 of the cartridge 14. The insertion means 62 taper downward from a top edge 84 and upwards from a bottom edge 86 of each respective one of the first pair of parallel walls 68 and 70 to a point 88. The tapered portion 62 projects and tapers in a direction outwards away from the rear face 66 of the cartridge 14.

In use the cabinet 12 is placed in a desired location. One of the plurality of storage cases 16 is placed through the opening 76 in the front face 64 of one of the plurality of cartridges 14. The cartridge 14 in turn is placed through the open face 64 of the cabinet 12 with the rear face of the cartridge 66 oriented towards the rear of the cabinet 28 and the first pair of parallel walls 68 and 70 lying adjacent and parallel to the respective opposing side walls 40, 42 of one of the partitions 30, 32, 34. The cartridges 14 are also oriented so that all of the second pair of parallel walls 70, 72 having the finger notch 77 are arranged to lie on the same side of the respective cartridge 14 when in the cabinet 12. This places the finger notch 77 of each cartridge 14 next to the wall without the finger notch 77 on each adjacent cartridge 14.

As the cartridge 14 is inserted into the cabinet 12 the free end of the tab 82 engages the inner face 40, 42 of one of the side walls 36, 38 of one of the partitions 30, 32, 34 which causes the tab 80 to be bent inwards applying a force to the cartridge 14 and the wall. This force is selected to be strong enough to hold the cartridge 14 in place in the cabinet 12 when a storage case 12 is removed from the cartridge 14, while allowing the cartridge 14 to be moved manually longitudinally along the inside of the partition.

The user fills each of the partitions 30, 32, 34 with storage cases 16 and organizes the storage cases 16 according to criteria defined by the user. When initially filling each partition a predetermined amount of space is left at the top of the partition for cartridge 14 that may need to be inserted at a later time. The space is hidden by the apron 44 which is designed to cover the portion of the partition that is left empty allowing the user to leave spaces for a selected number of cases yet still have an aesthetically pleasing cabinet front face. The apron 44 can be moved into and out of position to allow access to this space when needed. Once filled the user can remove one of the storage cases 16 from its respective cartridge 14 without removing the cartridge 14 from the cabinet 12. The storage case 16 can then be replaced in its cartridge 14 which has remained in its allotted location.

Figure 8:
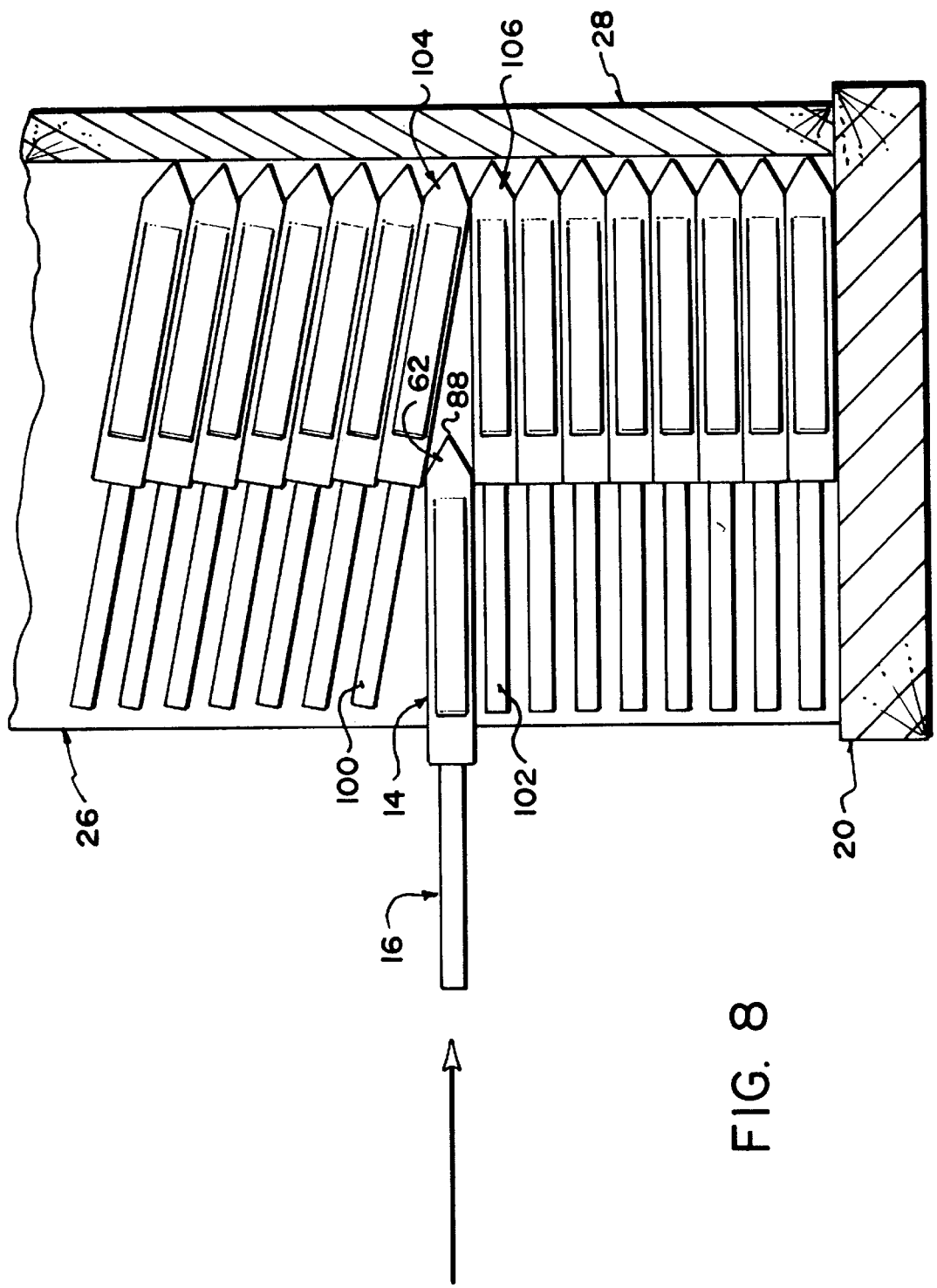
FIG. 8 shows a cartridge and storage case being inserted into the cabinet.

To insert additional storage cases the new storage case 16 is first placed within a cartridge 14 see FIG. 8. The desired location within the cabinet 12 according to the organizational scheme is determined. The point 88 of the insertion means 62 is placed between the two storage cases 100 and 102 in the cabinet between which the new cartridge 14 and case 16 is to be located. The new cartridge 14 and storage case 16 are then pushed in towards the cabinet 12. This causes the tapered insertion means 62 to force one or both of the two other storage cases 100 and 102 and their respective cartridges 104 and 106 to move apart relative to one another along the row. This allows the cartridge 14 and storage case 16 to move into the proper location without shuffling any of the cases in the partition.

To remove an empty cartridge 14 which is no longer required at a particular location within the cabinet 12 the user reaches into the cabinet 12 and manually grasps the one of the second pair of parallel walls 74 which does not have the finger notch 25 and draws the cartridge 14 out through the front face 26 of the cabinet 12.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A storage system for use with storage cases comprising:
   a cabinet comprising at least one partition having two side walls, each side wall having an inner face arranged such that the respective inner faces lie opposite one another and spaced apart from one another;
   a plurality of storage cases;
   a plurality of cartridges, each one of said plurality of cartridges being sized and arranged for receiving at least one of said plurality of storage cases, and having engagement means for engaging the inner faces of the side walls of said at least one partition thereby holding the cartridge in place;
   and wherein each one of said plurality of storage cases is manually removable from and reengageable with a respective one of said plurality of cartridges;
   and wherein said plurality of cartridges are arranged in a row within said cabinet thereby presenting said plurality of storage cases;
   and wherein each one of said plurality of cartridges is moveable along said row, and removable and reinsertable at any location within said cabinet.

2. A storage system in accordance with claim 1 wherein each cartridge includes a front face, a rear face, a first pair of parallel walls perpendicular to the front and rear faces and arranged to lie adjacent and parallel to the opposing inner faces of the at least one partition, and a second pair of parallel walls perpendicular to the front and rear faces, and to the first pair of parallel walls.

3. A storage system in accordance with claim 2 wherein the engagement means comprise a friction member facing outwards of each cartridge for frictionally engaging the inner faces of the side walls of the at least one partitions.

4. A storage system in accordance with claim 3 wherein the friction member is a tab arranged on an outer surface of the cartridge.

5. A storage system in accordance with claim 4 wherein the tab is arranged on one of the first pair of parallel walls.

6. A storage system in accordance with claim 4 wherein the tab is elongate and extends longitudinally along the one of the first pair of parallel walls, angling outwards from the first pair of parallel walls.

7. A storage system in accordance with claim 4 wherein the tab is composed of a resilient material.

8. A storage system in accordance with claim 1 wherein the engagement means comprise a friction member facing outwards of each cartridge for frictionally engaging the inner faces of the side walls of the at least one partitions.

9. A storage system in accordance with claim 8 wherein the friction member is a tab arranged on an outer surface of the cartridge.

10. A storage system in accordance with claim 9 wherein the tab is composed of a resilient material.

11. A storage system in accordance with claim 2 wherein the front face of each cartridge is open for receiving a storage case therethrough.

12. A storage system in accordance with claim 11 wherein one of the second pair of parallel walls includes a finger notch extending along an edge adjacent the open front face and projecting from the edge into the wall.

13. A storage system in accordance with claim 11 wherein each cartridge includes an insertion means arranged opposite the open face for engaging cartridges positioned within the cabinet when being inserted thereby causing the cartridges positioned within the cabinet to move in opposite directions away from one another along the row.

14. A storage system in accordance with claim 13 wherein the insertion means comprise a tapered portion arranged such that the tapered portion projects outwards from the rear face of the cartridge and tapers in a direction away from the rear face of the cartridge.

15. A storage system in accordance with claim 14 wherein an elongate tab extends longitudinally along one of the first pair of parallel walls angling outwards from said first pair of parallel walls, and wherein the insertion means are located on the tab at an end of the tab adjacent the rear face of the cartridge.

16. A storage system in accordance with claim 1 wherein the cabinet includes: an open front face of the cabinet; a pair of end walls being arranged perpendicular to the side walls of the at least one partition such that each end wall is located at a respective opposing end of the side walls; and an apron being removably and reengagably fixed adjacent one of the pair of end walls such that when engaged said apron covers a portion of the open front face of the cabinet.

17. A storage system in accordance with claim 16 wherein the apron is moveable between a first position thereby covering the portion of the open front face, and a second position thereby uncovering the portion of the cabinet.

* * * * *